United States Patent [19]

Jackson et al.

[11] 4,308,934

[45] Jan. 5, 1982

[54] WORK SUPPORT

[75] Inventors: Ronald A. Jackson, Brockville; John Maruscak, Athens, both of Canada

[73] Assignee: Black & Decker Inc., Newark, Del.

[21] Appl. No.: 10,210

[22] Filed: Feb. 8, 1979

[51] Int. Cl.[3] ........................ F16M 11/00; E04G 1/32

[52] U.S. Cl. .................................... 182/184; 182/185; 182/224

[58] Field of Search ............................ 182/181-185, 182/224-227, 187, 136; 248/188

[56] References Cited

U.S. PATENT DOCUMENTS

| | | | |
|---|---|---|---|
| 351,143 | 10/1886 | Whittingham | 182/187 |
| 371,279 | 10/1887 | Richstine | 182/184 |
| 714,761 | 12/1902 | Tilley | 182/186 |
| 860,161 | 7/1907 | Thomas | 182/185 |
| 878,455 | 2/1908 | Carter | 182/187 |
| 1,271,095 | 7/1918 | Staines | 182/184 |
| 1,441,806 | 1/1923 | Hoitsma | 182/136 |
| 2,038,899 | 4/1936 | Hoitsma | 182/136 |
| 2,216,912 | 10/1940 | Hoitsma | 182/136 |
| 2,583,437 | 1/1952 | Newlon | 182/181 |
| 2,891,819 | 6/1959 | Jackson | 182/184 |
| 3,080,015 | 3/1963 | Van Devender | 182/181 |
| 4,062,423 | 12/1977 | Armbruster | 182/181 |
| 4,228,871 | 10/1980 | Koffski | 182/184 |

*Primary Examiner*—Reinaldo P. Machado
*Attorney, Agent, or Firm*—Harold Weinstein; Edward D. Murphy; Walter Ottesen

[57] ABSTRACT

A one piece frame or channel for a work support which is usable during building or construction principally as a support at ground level or as a scaffold at elevated levels regardless of whether the surface is even, irregular or constitutes different heights. The channel is used in pairs to form the work support. A plurality of legs are conveniently made from two-by-fours which are clamped to the channel at a suitable height in conformance with the ground so as to set the plank horizontally which plank extends across the pair of laterally spaced channels. Top brackets are interlocked in the top portion of the channels to engage and to hold the plank in assembled position.

A clamp is carried on leg portions of the channel on an axle journaled in punched support lugs. A spring biases the clamp to engage the legs. Teeth are formed on the clamp to secure the legs in adjusted position. The channel has a base at its inner side formed with a radius at the edges thereof which turn out into flanges, which radius co-acts with the clamp to wedge-lock the right angled edges of the leg thereagainst.

Lock tabs are formed on the top brackets to freely slide within outturned support flanges of the channel to permit adjustment of the top brackets prior to their being bolted in assembled position. When disassembled the top brackets can be stored within the top portion of the channel.

16 Claims, 11 Drawing Figures

WORK SUPPORT

BACKGROUND OF THE INVENTION

Sawhorses or work supports of the prior art were complex, costly and often required long set-up time, especially if the ground over which the work was to be done included obstacles such as stairs or was uneven or irregular. Though work supports may be useful at ground level for such operations as sawing, they find most of their applications in building or construction that must be done at raised elevations, wherein the work supports may be termed scaffolds.

If the legs of the prior art work supports were adjustable, many times the adjustment was not easily made, the leg had to be cut or connected to fit a particular size, or when used over a period of time they could not always be readily or repeatedly adjusted to a set height or position. Also, once adjusted the legs of some work supports did not remain in adjusted position unless mechanically connected.

SUMMARY OF THE INVENTION

It is an object of the invention to provide an improved work support, and frame or channel therefor which overcomes the prior art disadvantages; which is simple, economical and reliable; which is stable on all surfaces, even or irregular; which uses at least a pair of one piece channels; which channel has leg portions bent downwardly and outwardly and may be set at a compound angle for added stability; which leg portions include arcuate corners at the edges of the base thereof against which the right angle edges of the legs are wedge-locked by a clamp; which channel has a top portion to which top brackets are slidingly affixed to engage a plank; which forms a work support from laterally spaced channels connected at each end of the plank and from which a plurality of legs adjustably extend; which channel has leg portions with recesses which are open on the outer channel side thereof so as to receive the legs therein for clamping thereto; which channel includes integrally formed lugs to which the clamp is pivotally mounted; and which has the top brackets storable in the top portions of the channel when in unassembled position.

Other objects and advantages will be apparent from the following description of illustrated embodiment of the invention and the novel features will be particularly pointed out hereinafter in the claims.

DESCRIPTION OF THE INVENTION

Figure 1:
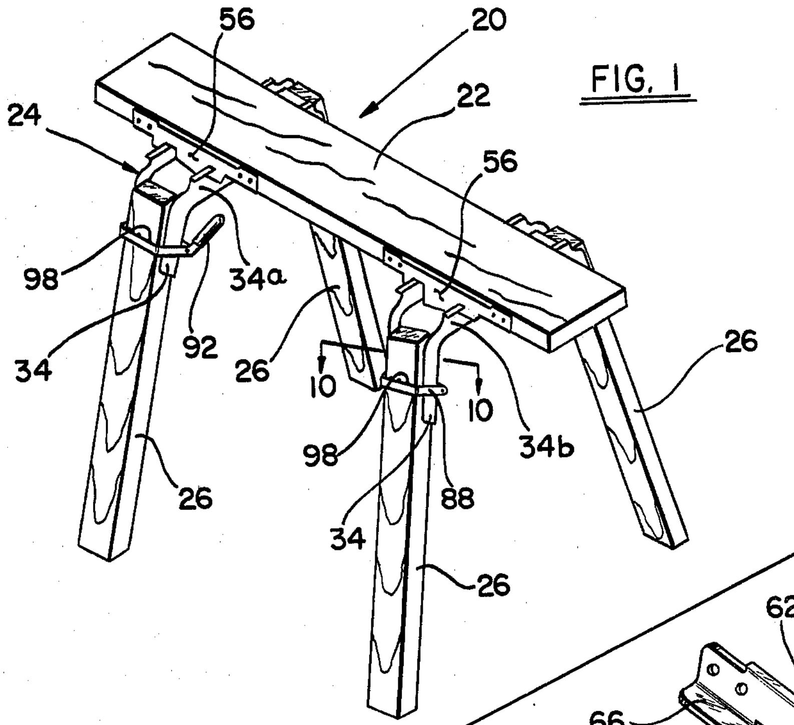
FIG. 1 is a perspective view of the improved work support including the novel frame of the present invention.
Figure 6:
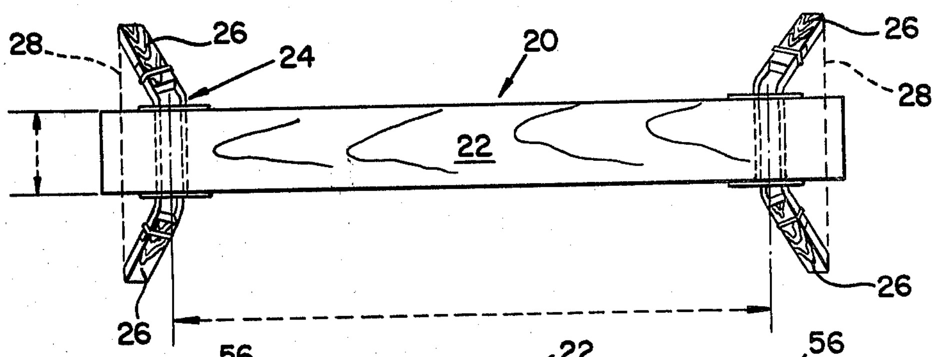
FIG. 6 is a top plane view of the improved work support of the present invention showing the legs set at a compound angle.

In the illustrated embodiment of the invention, a work support, designated generally as 20, is depicted in FIGS. 1 and 6 as having a plank 22 carried by a pair of laterally spaced frames or channels 24 to which pairs of legs 26 have been connected, one at each of the work support's four corners. To improve stability of the work support 20 the legs 26 have been connected within the channel 24 at a compound angle so that not only is the distance between adjacent legs greater at the bottom (ground) than at the top (plank), but also the legs have been slanted as best seen in FIG. 6 from the outer end toward the center so that there is a natural overhand of the plank in super-position to a hypothetical line 28 drawn between the bottom of the adjacent legs 26.

Figure 2:
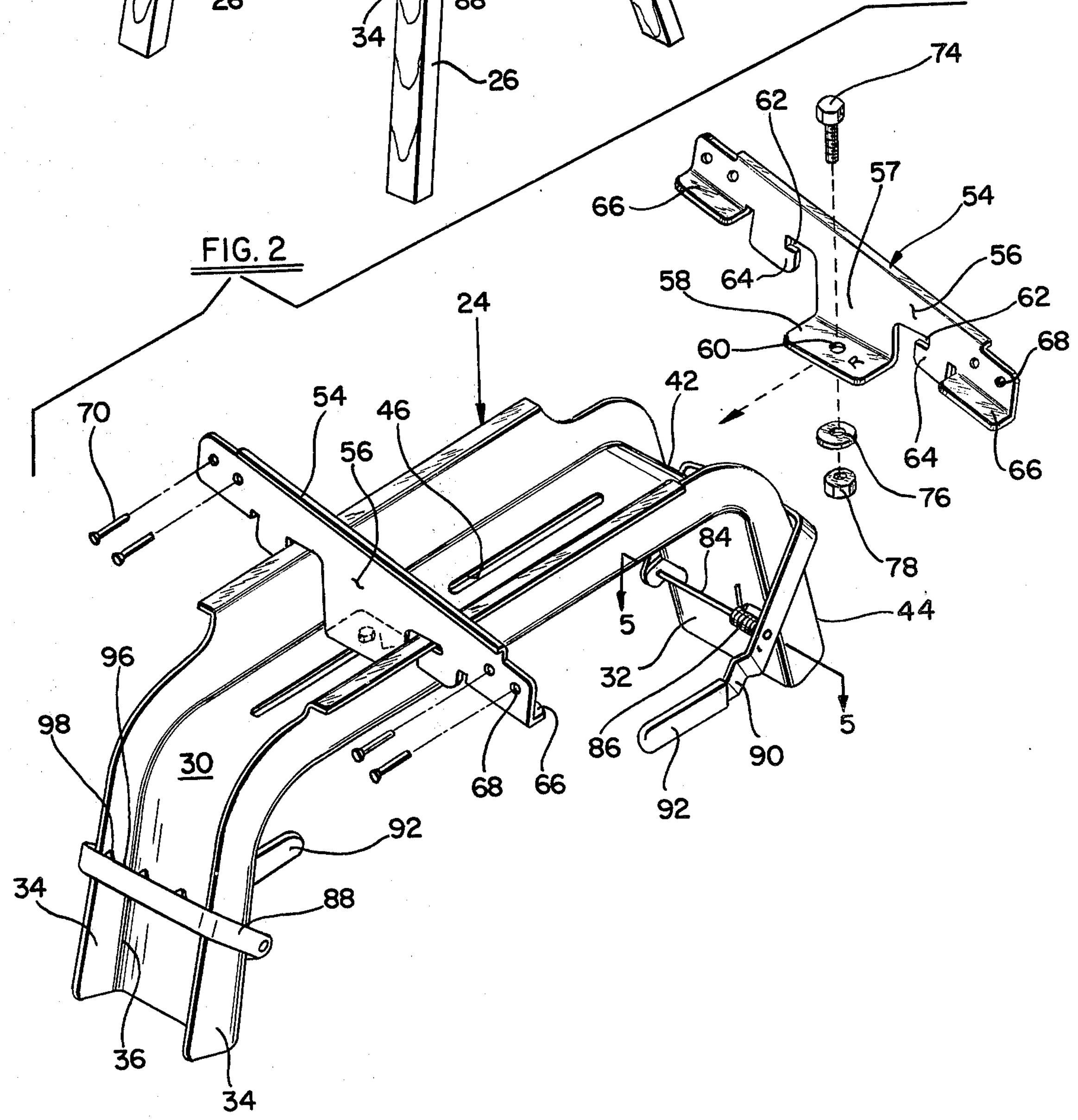
FIG. 2 is a partially exploded view of the improved frame showing the novel channel of the present invention.
Figures 3, 4, 5, 10, 11:
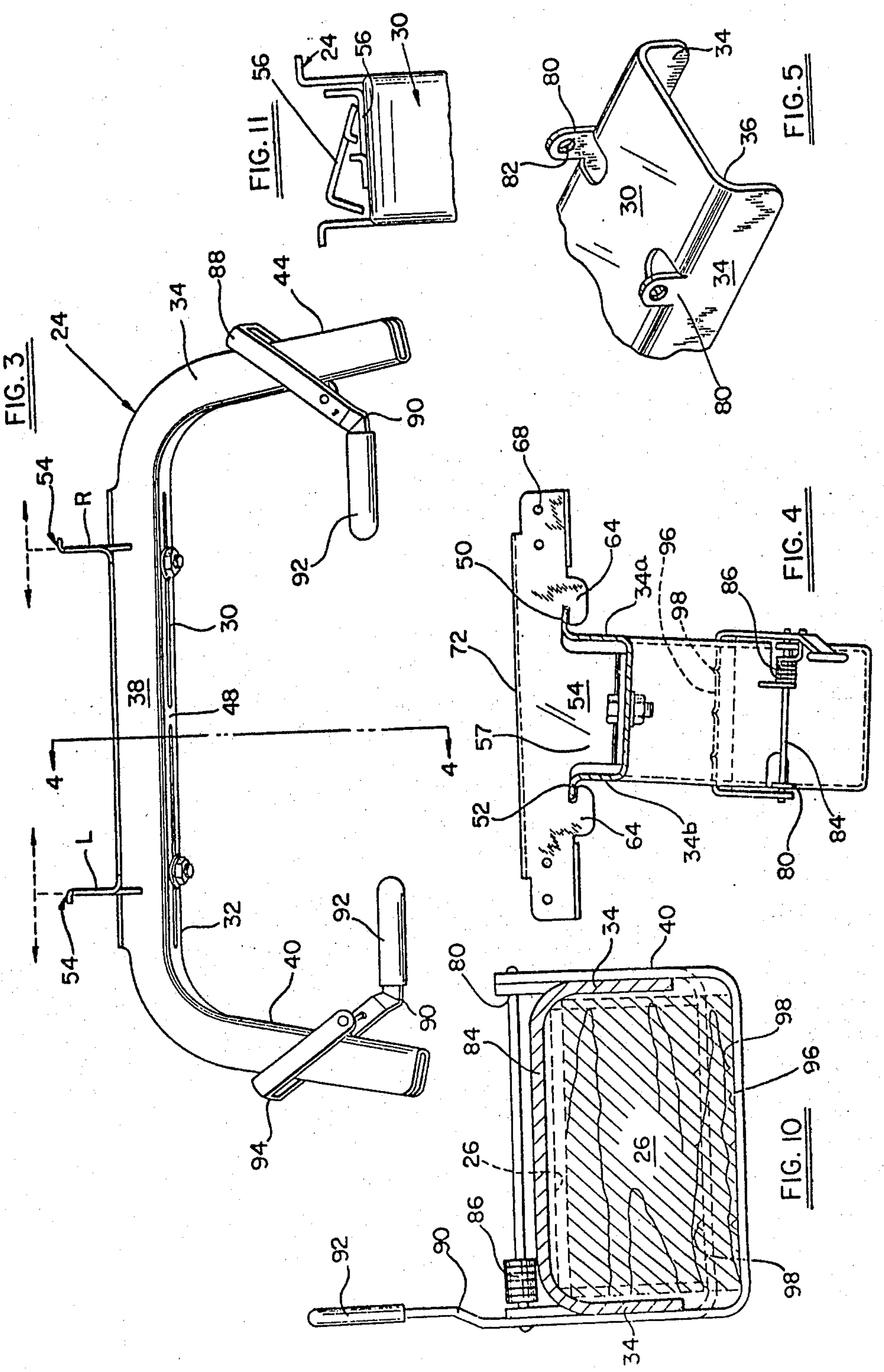
FIG. 3 is a front elevational view turned slightly to show the base of the improved channel at the inner side thereof.
FIG. 4 is a cross sectional view taken along lines 4—4 of FIG. 3.
FIG. 5 is a cross sectional view taken along lines 5—5 of FIG. 2 and rotated approximately 90° to show the punched out support lugs with the clamp, spring and axle removed.
FIG. 10 is a cross sectional view taken along lines 10—10 of FIG. 1.
FIG. 11 is a partial end elevational view of the improved channel showing the top brackets nested within the recess of the top portion of the channel for a compact package.

The channel 24 illustrated in FIGS. 2, 3 and 4 is of unitary construction having been formed from a one piece sheet metal plate which has been processed by a conventional die stamping/drawing operation to mass produce the desired configuration in the most economical manner consistent with good manufacturing practices.

The channel 24 shown in FIGS. 2, 3 and 4 has a base 30 formed at the inner side 32 thereof with outturned flanges 34 formed at the outer edges 36 thereof. The channel 24 has a top portion 38 which is bent downwardly and outwardly at its opposite ends to form leg portions 40 of equal length. The length of the top portion 38 is more than the combined length of the two leg portions 40. In the preferred embodiment the channel 24 is shown having a continuous base 30 and outturned flanges 34 which extend between the top portion 38 and leg portion 40. This produces a continuous recess 42 which has an opening at the outer side 44 of the channel 24. Because of the compound angle at which the legs 26 will be set, each of the channels 24 shown in FIGS. 1 and 6 slope towards each other, so that the top portion 38 has a forward flange 34*a* formed on the side of the base 30 facing the opposite forward flange 34*a* which is higher than the rear flange 34*b* of said top portion 38. Two aligned longitudinal slots 46 are formed centrally of the base 30 to terminate a short distance from the leg portions 40, with a separating web 48 being formed centrally of the top portion 38. The upper end of the front flange 34*a* is turned outwardly to form a support flange 50, and the rear flange 34*b* turns outwardly to form a support flange 52 which extends oppositely from that of flange 50 whereby each of the flanges 50 and 52 will lie in a substantially horizontal plane coincident to the plane of the plank 22.

A top bracket 54 is illustrated in FIGS. 1, 2, 3 and 4 as having a body 56 the longitudinal length of which is substantially shorter than the length of the top portion 38, but at least twice the width of the base 30 across which it will extend in assembled position are more fully described hereinafter. The body 56 has a lower portion 57 of slightly smaller width than the width of the base 30 into which it is disposed. The lower portion 57 is turned outwardly to form a connecting flange 58 having a central aperture 60. The top brackets 54 are formed in pairs, one being for the right hand side of the plank 22 and the other being for the left hand side. The flanges 58 of the top brackets 54 are used to identify the right and left hand brackets and therefore are stamped "R" or "L" to so indicate. This is determined by the direction in which the connecting flange 58 extends, so that with reference to FIG. 2 the top bracket 54 shown exploded off the figure has its connecting flange 58 turned in the direction of the web 48 and will constitute the right hand top bracket 54 as indicated by the stamped "R". The other top bracket 54 has been stamped with an "L" shown in dotted line representation and its connecting flange 58 will also face the web 48. Short slots 62 are formed on either side of the lower portion 57 and locking tabs 64 are formed thereunder to extend toward each other and to terminate a short distance from the lower portion 57 so as to provide a slide fit between the support flanges 50 and 52 and the top bracket 54. Outwardly of the locking tabs 64 and substantially in alignment with or slightly below the slots 62 are two inwardly turned flanges 66 above which the body 56 has a plurality of small apertures 68 through which fasteners 70 shown in FIG. 2 may pass to connect the plank 22 to the top brackets 54. A stiffening flange 72 is formed along the top surface of the body 56 to run substantially the greater part of the length thereof terminating a short distance from either end of the body 56. The lower portion 57 of the body 56 is slanted to form the flange 58 thereon corresponding to the slant of the base 30 and heights of the flanges 34*a* and 34*b* so that the remaining components of the top bracket 54 will be formed in parallel planes to that of the plane passing through the support flanges 50 and 52. The connecting flange 58 fits within and is connected atop the base 30 by a bolt 74 passing through the aperture 60 and slot 46 to receive on the inner side 32 a washer 76 and connecting nut 78 so as to form an adjustable connection as depicted in FIGS. 2, 3 and 4. In this manner when the nuts 78 are tightened to the bolts 74 the top brackets 54 will be securely held by the flanges 50 and 52 of the top portion 38. Prior to tightening the top brackets 54 are permitted to slide along the length of the respective right hand and left hand halves of the top portion 38 prior to engagement with the plank 22. Thereafter the assembled position is shown in FIGS. 1 and 6.

The base 30 of the leg portions 40 shown best in FIGS. 2 and 10 has a width of sufficient dimension to accommodate the size of most standard tolerance two-by-fours which because of their price and availability will conveniently make up the legs 26. The corner 36 is substantially arcuate and may be formed by having a radius of, for example, five-sixteenths of an inch (5/16") at the intersection between the base 30 and each of the flanges 34. Support lugs 80 are punched from the base 30 as shown in FIG. 5 at a distance somewhat below one-half the length of the leg portion 40 in aligned pairs with apertures 82 centrally therein. An axle 84 will extend across the lugs 80 passing through the apertures 82. A coil spring 86 is fitted upon the axle 84 at one side thereof. A substantially U-shaped clamp 88 has the end opposite the spring 86 pivotally connected to the axle outwardly of the lug 80 to encircle each of the adjacent flanges 34 and the opening of the recess 42 by having two 90° turns before making a second pivotal connection to the axle 84 at the opposite lug 80 adjacent the spring 86 whereby the clamp 88 extends therebeyond to form a handle 90 which receives a vinyl hand grip 92. One end of the coil spring 86 will bear against the inner side 32 of the base 30 while the opposite end is affixed to the clamp 88 so as to yieldably urge the clamp 88 toward the base 30 whereby it will be inclined upwardly toward, while extending outwardly from the top portion 38 of the channel 24. The portion of the clamp 88 that extends across the recess 42 is substantially flat and has a trailing edge 94 and a leading edge 96 which lies closer to the recess 42 and has a plurality of short teeth 98 formed thereon to releaseably engage the outer side of the two-by-four legs 26 as best seen in FIGS. 1 and 10. The handle 90 is bent normally to extend horizontally away from its connected leg portion 40. Each of the clamps 88 are the same, except that the opposite handles are adjacent to diametrically opposite flanges 34.

In assembling any one of the legs 26 can be connected to the leg portions 40 of the channel 24. To make this connection the individual leg 26 will be slid from the bottom of the channel 24 upwardly into the recess 42 of the leg portion 40 and the operator will grasp the grip 92 and raise the handle 90 upwardly to open up the clamp 88 and permit the top of the leg 26 to pass therethrough to assume a desired height setting for the leg 26 which setting will correspond to the ground or surface level over which the work support 20 is to be assembled, with samples of such heights being shown in FIGS. 7, 8 and 9. Release of the handle 90 will force the clamp 88 to engage the leg 26 and cause the teeth 98 to bite into the adjacent surface of the two-by-four. The two-by-fours forming the legs 26 will vary in their respective rectangular cross section as is illustrated in FIG. 10 by the solid line and dotted line representation thereof. To accommodate this the radius of adjacent corners 36 will engage the right angle edges of the inserted edge of the two-by-four legs 26, and under the urging of the clamp 88 act to wedge-lock such edges against the respective corner 36 to produce a stable connection of the leg 26 to the leg portion 40 of the channel 24 and prevent unwanted shifting thereof once the connection has been made. The solid line representation of the leg 26 of FIG. 10 shows a wider two-by-four that engages the radius of the corner 36 at a higher point from the base 30 which through the action of the clamp 88 will be forced to substantially be self aligned within the leg portion 40. The dotted line representation of the leg 26 shows a somewhat smaller two-by-four which will fit deeper within the leg portion 40 but nonetheless still engage the radius of the corners 36 but at a point closer to the base 30 so as to also obtain a stable connection.

Figure 7:
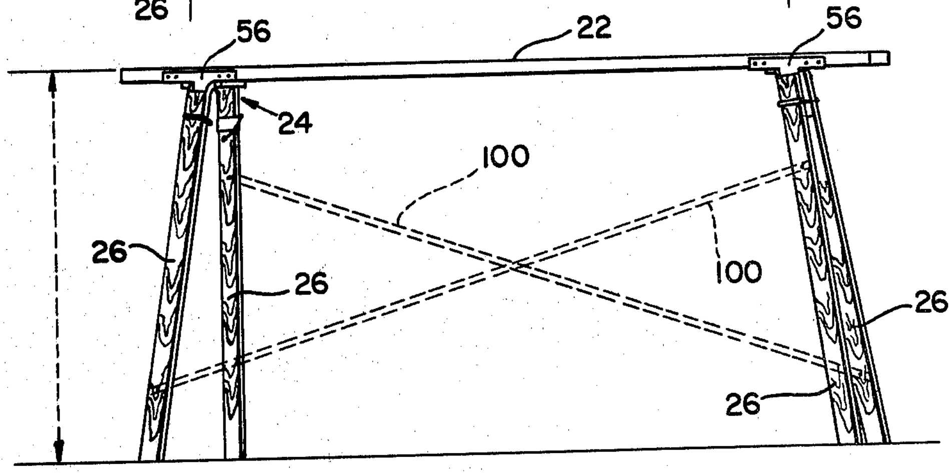
FIG. 7 is a side elevational view of the improved work support of the present invention showing the work support on level ground and being used as scaffold with a dotted line representation of bracing for the legs.

The plank 22 shown in FIGS. 1 and 6 is recommended to be made of a solid one piece wood or other suitable strong material having a total length no longer than eight feet with the channels 24 set on six foot centers. Convenient widths sizes for the plank 22 run from two-by-six through two-by-twelve. The leg portions 40 are sized to receive the wide dimension of the two-by-fours. It is not recommended to use legs 26 at heights above six feet unless cross bracing 100, shown in FIG. 7, is used. In FIG. 7 the work support 20 is used at an elevated height on even ground to which bracing 100 is included.

Figure 8:
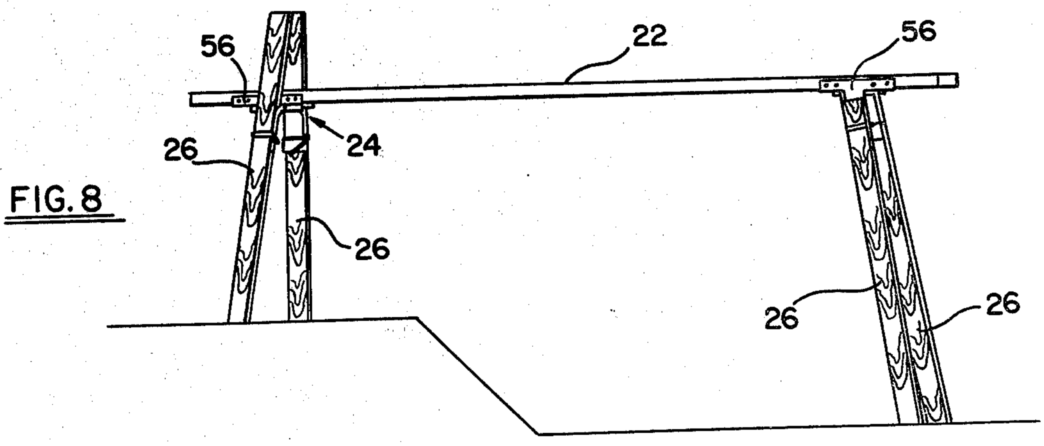
FIG. 8 is a side elevational view of the improved work support of the present invention showing two surface levels, with the work support being used as a scaffold.
Figure 9:
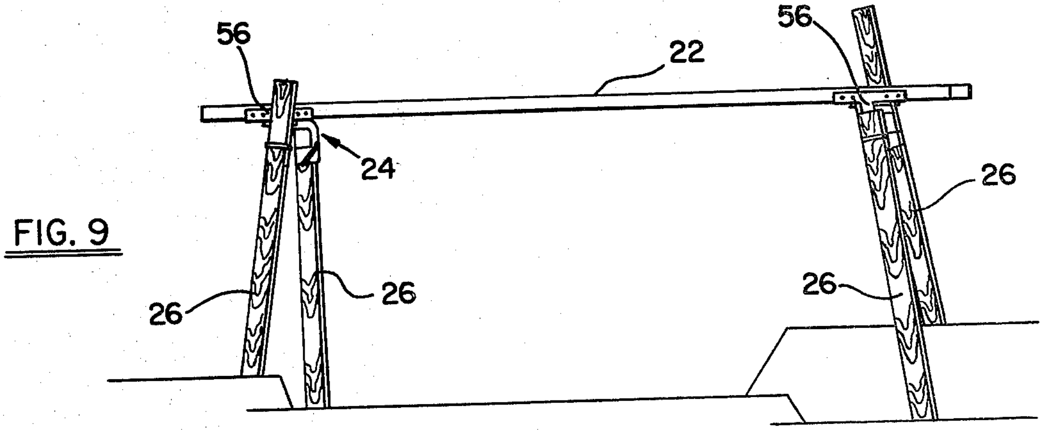
FIG. 9 is a side elevational view of the improved work support of the present invention showing each of the legs thereof adjusted for different surface levels, with the work support being used as a scaffold.

The present invention makes it easy and practical to maintain the plank 22 in a horizontal position regardless of the leg 26 adjustment which has to be made in order to accommodate any irregularities in the surface some of which are suggested in FIGS. 8 and 9. All that is necessary to do is to open the clamp 88 to permit the height of each of the various legs 26 to be set in a manner described hereinbefore so as to accommodate the surface in question. The channel 24 has a top portion of sufficient length so as to permit a substantial "overhang" of the top portion of either or both of the adjacent two-by-four legs 26 as is shown in FIG. 8 (left side) or in FIG. 9, without interfering with the plank 22.

A further advantage of the channel 24 of the present invention is that in disassembled position the top brackets 54 may be conveniently nested within the top portion 38 as is illustrated in FIG. 11. This makes for a convenient and relatively small package in which pairs of channels 24 may be included.

It will be understood that various changes in the details, materials, arrangement of parts and operating conditions which have been herein described and illustrated in order to explain the nature of the invention may be made by those skilled in the art within the principles and scope of the invention.

Having thus set forth the nature of the invention what is claimed herein is:

1. A frame for a work support to carry a plank and to receive legs of varying heights comprising:

(a) a channel of one piece, having a base formed on the inner side thereof with outturned flanges at opposite edges of the base, (b) the channel has a top portion to receive the plank and oppositely formed leg portions sloping outwardly and downwardly from the top portion, (c) the leg portions have continuous recesses extending from the inner side of the channel to open at the outer side of the channel, (d) at least one top bracket affixed to the top portion of the channel to engage and to hold the plank thereon, (e) a pair of support lugs formed integrally with each of the leg portions, and (f) a clamp extending across the recess of each of the leg portions to be pivotally connected to the support lugs to releasably engage the legs and set the individual heights thereof.

2. The combination claimed in claim 1 wherein:

(a) biasing means is connected between the clamp and the leg portions to urge the clamp toward the base of the channel to hold the legs in adjusted positions within the recesses of the channel.

3. The combination claimed in claim 2 wherein:

(a) the clamp is a one piece member which encircles the channel from lug to lug and has one of its ends extending substantially beyond the channel to form a handle.

4. The combination claimed in claim 3 wherein:

(a) the clamp extends at an angle to the leg portion, (b) the handle is bent to lie in a substantially horizontal plane, and (c) a vinyl handle grip is affixed over the handle.

5. The combination claimed in claim 4 wherein:

(a) the biasing means define a spring interconnected between the clamp and the leg portion to urge the clamp in the direction of the base.

6. The combination claimed in claim 1 wherein:

(a) the top bracket includes a pair, one being disposed on each side of the plank, (b) the base of the channel being slotted across the top portion thereof, and (c) fastener means adjustably connecting the top brackets to the base within the top portion of the channel whereby the plank is securely held therebetween.

7. The combination claimed in claim 2 wherein:

(a) a pair of support lugs is punched out of the channel at the closed side of the channel to extend in a direction away from the open side thereof, (b) the clamp extending across the open side of the leg portion from lug to lug, (c) an axle journaling the clamp to the lug, and (d) a spring interconnected between the clamp and the leg portion to yieldably urge the front portion of the clamp toward the recess whereby the leg will be forced into the recess and the right angle edges thereof wedge-locked into engagement with the radius therein.

8. The combination claimed in claim 7 wherein:

(a) the length of each of the leg portions is shorter than the length of the top portion of the channel.

9. The combination claimed in claim 8 wherein:

(a) the combined length of both leg portions is less than the length of the top portion of the channel.

10. The combination claimed in claim 9 wherein:

(a) the leg portions are formed at a compound angle so as to have the bottom of adjacent legs intersect a hypothetical vertical plane which in turn intersects a hypothetical horizontal plane in which the plank is disposed.

11. The combination claimed in claim 2 wherein:

(a) at least one outturned top flange is formed at the upper surface of the top portion of the channel supportively to receive the plank, and (b) the top brackets have a locking tab extending beneath the top flange to permit sliding engagment between the top bracket and the top portion of the channel.

12. The combination claimed in claim 11 wherein:

(a) the top flange is formed as a pair of top flanges extending outwardly from the top portion in opposite directions, and (b) a pair of lock tabs formed on the top bracket, one slidingly engaged with each of the top flanges to hold the top brackets to the top portion of the channel.

13. The combination claimed in claim 12 wherein:

(a) the top brackets having a pair of inwardly turned flanges lying in substantially the same plane as the plane of the said top flanges to provide further support for the plank and prevent dislodging thereof.

14. The combination claimed in claim 13 wherein:

(a) the leg portions are formed at a compound angle so as to have the bottom of adjacent legs intersect a hypothetical vertical plane which in turn intersects a hypothetical horizontal plane in which the plank is disposed, and (b) the top brackets formed in a pair of facing right hand and left hand brackets set off at an angle corresponding to the angle of the top portion so that the top surface thereof lies in a plane above and parallel to the plane of the top flange.

15. The combination claimed in claim 14 wherein:

(a) the top brackets having a plurality of predetermined openings along the length thereof, and (b) fastening means to pass through the last mentioned openings and to engage the sides of the plank to lock the plank to the top brackets and channels.

16. The combination claimed in claim 2 wherein:

(a) the top portion of the channel has a width substantially equal to the width of the legs and a predetermined depth and length, (b) the top brackets having a length shorter than the length of the top portion of the channel, (c) the top brackets normally in assembled position are disposed perpendicular to the top portion and lying across the width thereof and extending beyond the opposite sides of the top portion, and (d) the top brackets are nested within the inside of the top portion of the channel in disassembled stored position.

* * * * *